Sept. 10, 1957  C. PREUSS  2,805,785
AUTOMATIC TRANSFER DEVICE
Filed June 21, 1952  3 Sheets-Sheet 1

CHARLES PREUSS
INVENTOR

HUEBNER, BEEHLER,
WORREL & HERZIG
ATTORNEYS

CHARLES PREUSS
INVENTOR

HUEBNER, BEEHLER,
WORREL & HERZIG
ATTORNEYS

BY Richard M. Worrel

Sept. 10, 1957     C. PREUSS     2,805,785
AUTOMATIC TRANSFER DEVICE
Filed June 21, 1952     3 Sheets-Sheet 3
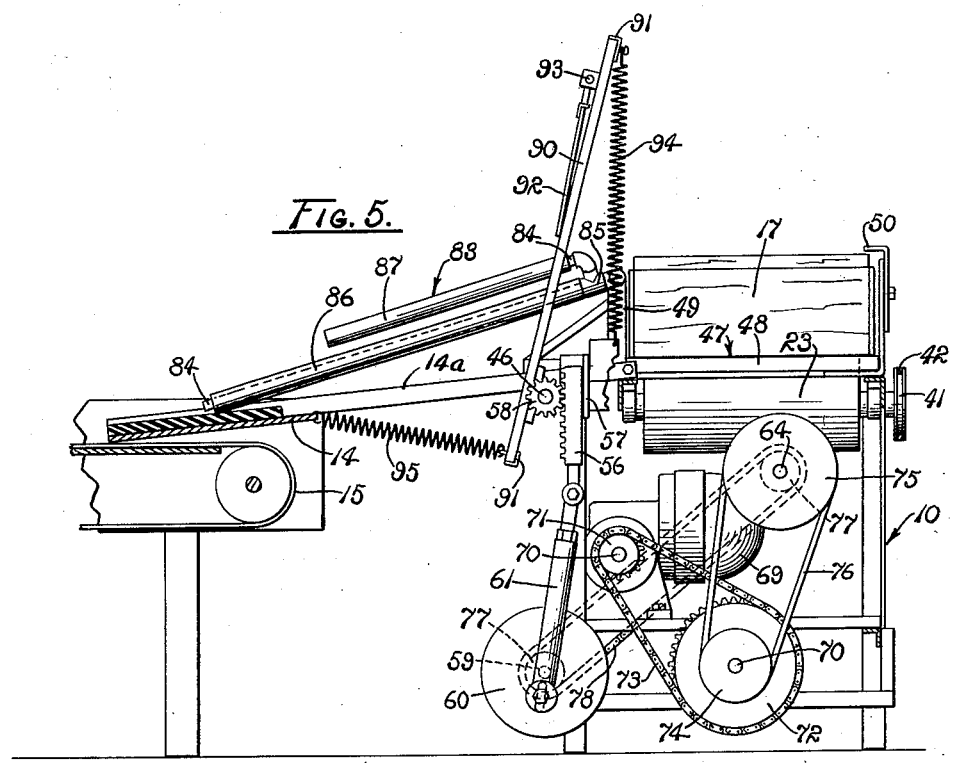
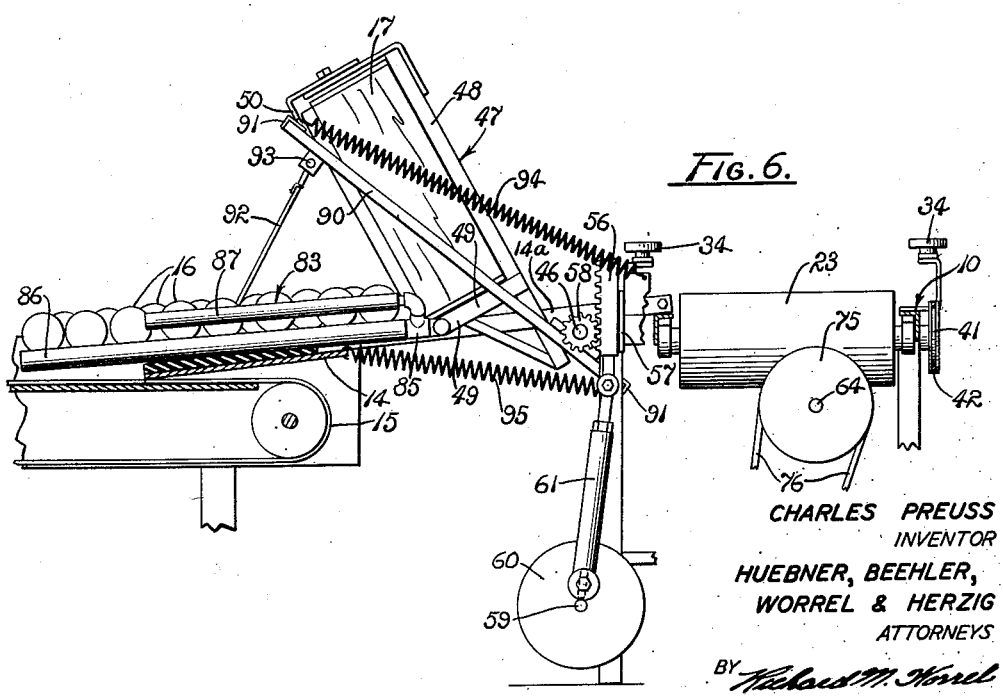
CHARLES PREUSS
INVENTOR
HUEBNER, BEEHLER,
WORREL & HERZIG
ATTORNEYS United States Patent Office 2,805,785
Patented Sept. 10, 1957

2,805,785

AUTOMATIC TRANSFER DEVICE

Charles Preuss, Clovis, Calif.

Application June 21, 1952, Serial No. 294,845

6 Claims. (Cl. 214—314)

The present invention relates to an automatic transfer device and more particularly to such a device adapted to dump boxes and other containers so as to discharge contents thereof and to return the boxes or containers to upright position for reuse, storage, or the like.

Although the subject invention possesses utility in various operational environments, it is conveniently illustrated and described in connection with the discharge of perishable fruit, vegetables, and the like, from picking boxes or other containers therefor for convenience in sorting, grading, packing, handling, or other processing.

In the harvesting of fresh fruits, for example, it is the usual practice to gather the fruit in the orchard or vineyard into picking boxes of a size suited to handling convenience in which the fruit is transported to a packing shed or cannery. The fruit is usually culled, graded, segregated as to size, and packed by hand. To facilitate such operations, the fruit is emptied from the picking boxes into elongated troughs, tables, or conveyors conveniently accessible for manual selection. Attendants are employed for the purpose of servicing such troughs, tables, or conveyors by emptying boxes therein. Such attendants perform their function with varied degrees of care, occasionally subject the fruit to excessive damage incident to careless dumping of the boxes, provide varied excessive and inadequate fruit supplies to the packers, and otherwise subject the culling, grading, sorting, and packing procedures to objectionable waste and inefficiency.

An object of the present invention is to provide an automatic transfer device suited to the power driven diversion of objects carried by a conveyor into an associated trough, chute, conveyor, or other object-receiving means.

Another object is to provide a fully automatic box dumping device.

Another object is to provide a box dumping device characterized by uniformity of operation and gentle treatment of material dumped from the boxes so as to minimize damage thereto.

Another object is to provide an automatic box dumping device suited to use in conjunction with packing troughs, tables, conveyors, and the like, to supply a conveniently regulated supply of fruit, vegetables, or other material for packing purposes.

Further objects and advantages will become apparent in the subsequent description in the specification.

Fig. 5 is a somewhat enlarged section taken on line 5—5 of Fig. 2 but showing a box in the device about to be dumped.

Fig. 6 is a view similar to Fig. 5 omitting portions thereof for illustrative convenience and demonstrating a successive operation.

Figure 1:
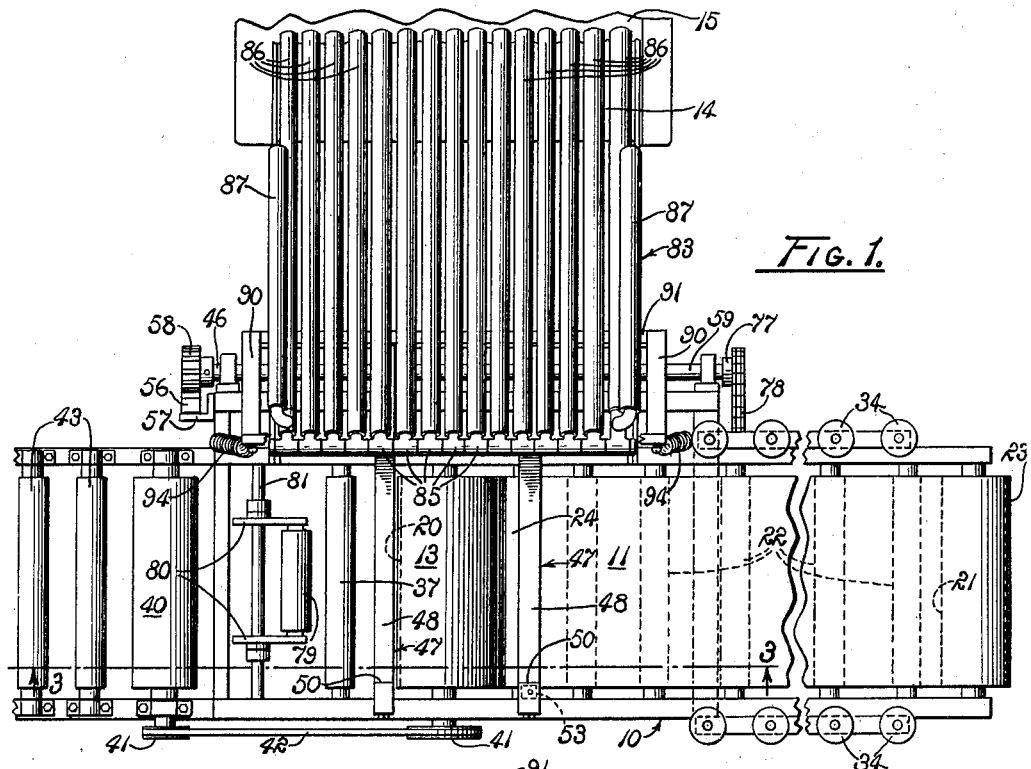
Fig. 1 is a fragmentary plan view of a box conveyor and packing conveyor right angularly related thereto illustrating the utilization of an automatic transfer device of the present invention in conjunction therewith for the purpose of dumping boxes supplied on the box conveyor onto the packing conveyor and to return such empty boxes to the box conveyor.

Referring in greater detail to the drawings:

A framework 10 of any suitable form serves to mount an elongated supply conveyor 11 thereon having a substantially horizontal upper surface 12. From a predetermined dumping station 13 intermediate opposite ends of the supply conveyor 11, a chute or trough 14 is laterally extended from the conveyor. A fragmentarily represented packing conveyor 15 is shown in position adapted to receive fruit or other material from the trough 14 and characterizes packing benches, tables, troughs, conveyors, and the like, to which it is desired to deliver fruit 16 or other material from boxes 17.

The supply conveyor 11 may be of any suitable form but conveniently includes a driving roller 20 rotatably mounted in the framework 10 at the dumping station 13, an idler roller 21 at a receiving end of the conveyor, and a plurality of support rollers 22 journaled transversely in the framework 10 intermediate the driving roller and the idler roller. An endless belt 23 is extended around the rollers in the manner clearly indicated in Figs. 1 and 2. For purposes soon to become apparent, a depressing roller 24 is mounted in engagement with the upper surface of the belt 23 adjacent to the driving roller 20 in the dumping station 13. To keep the belt taut, a tensioning roller 25 also may be rotatably mounted in the framework 10 in engagement with the belt.

A motor 28 having a transmission 29 has driving connection to the roller 20 as by a V-belt 30 mounted in circumscribing relation to pulleys 31 on the transmission and driving roller. In order to regulate the speed of supply of boxes 17 or other objects to the dumping station 13, the transmission 29 is preferably of any suitable variable speed type. The motor and transmission serve to drive the roller 20 in a direction advancing the upper run of the belt 23 and objects rested thereon toward the dumping station 13.

In order to align the boxes 17 longitudinally of the conveyor 11, a series of guide wheels 34 are mounted along opposite sides of the belt 30.

An idler roller 37 is rotatably mounted in the framework 10 in substantially parallel relation to the driving roller 20. It will be noted that the idler roller 37 provides a surface tangential to a plane of the belt 23 rested on the support rollers 22 and tangential to the belt turned about the driving roller 20.

An acceleration cylinder 40 is rotatably mounted transversely in the framework 10 in parallel spaced relation to the idler roller 37 and is rotated at a speed greater than that of the driving roller 20 by means of sheaves 41 of appropriate differences in diameter mounted on the cylinder and roller and circumscribed by a belt 42. Additional rollers 43 are rotatably mounted transversely in the framework 10 in positions adapted to receive boxes or the like from the acceleration cylinder 40 and to convey such boxes by gravity or driven propulsion, not illustrated, to any desired destination.

Figure 3:
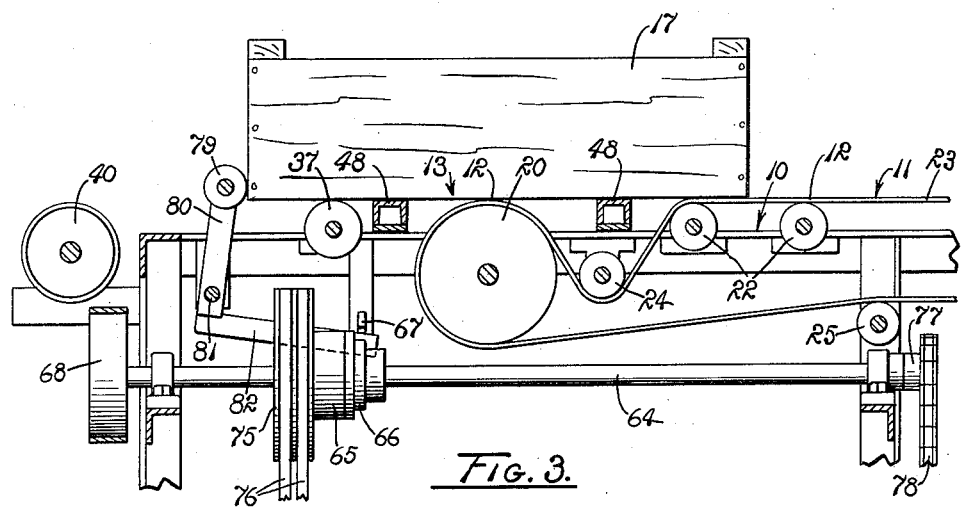
Fig. 3 is a somewhat enlarged fragmentary section taken on line 3—3 of Fig. 1 and showing a box in a position adapted to initiate a dumping action.
Figure 4:
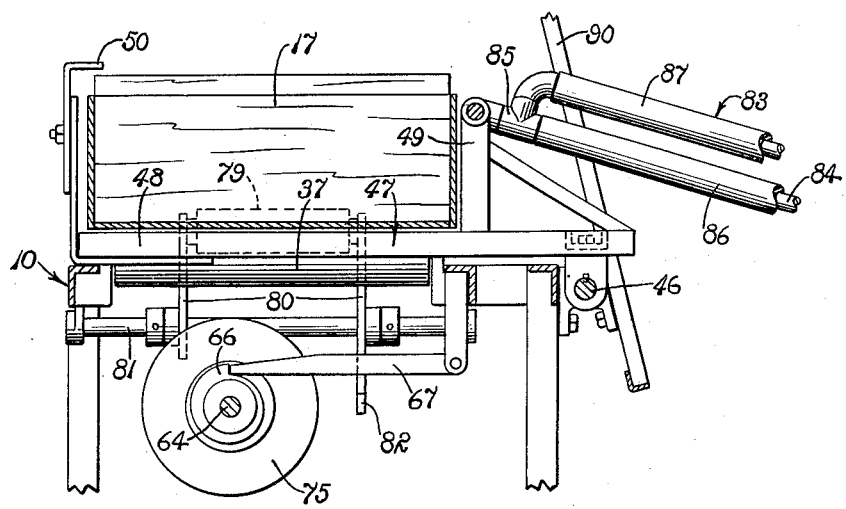
Fig. 4 is a somewhat enlarged fragmentary section taken on line 4—4 of Fig. 2.

As best shown by Figs. 4, 5, and 6, a shaft 46 is journaled in the framework 10 transversely of, and lower than, the upper end of the arms of the trough 14 in substantially parallel relation to the conveyor 11. Lifting means 47 having a floor portion 48 and a wall portion 49 in substantially right angular relation is rigidly mounted on the shaft for reciprocal movement between a receiving position with the floor portion extended transversely of the conveyor 11 below the upper surface thereof, as shown in Figs. 1 to 5, both inclusive, and a dumping position with the floor upwardly extended over the trough 14, as shown in Fig. 6. When the floor portion 48 is horizontally extended across the conveyor 11, the wall portion 49 provides a marginal side to the conveyor and when the floor portion is pivoted to dumping position the wall portion is downwardly inclined toward the trough 14. The floor portion conveniently takes the form of a pair of spaced arms, as shown in the drawings, from the outer ends of which are upwardly extended telescopically adjustable hook members 50 engageable over the sides of the boxes 17, as shown in Figs. 2, 4, 5 and 6.

A switch 53 of any suitable type, resiliently urged into open position, is mounted in the framework 10 in a position engageable by one of the arms of the floor portion 48 when in horizontal attitude and is electrically connected in series with the motor 28. Thus, when the floor portion 48 is in horizontal position, the switch 53 is closed to advance a box 17 over the floor portion 48. When the floor portion is elevated from the switch 53, in a manner to which reference is now to be made, the switch 53 opens so as to interrupt the motor 28 and to preclude delivery of any succeeding box to the dumping station 13 until the floor portion of the lifting means is returned to receiving position.

A rack gear 56 is mounted for reciprocal movement in the framework 10 adjacent to the shaft 46 by a guide 57. A pinion 58 is mounted on the shaft 46 in mesh with the rack gear. A shaft 59 is rotatably mounted in the framework 10 below the shaft 46 and has an eccentric 60 thereon. A pitman 61 interconnects the eccentric 60 and the rack gear 56 so that upon rotation of the shaft 59 the rack gear 56 is reciprocated and the shaft 46 oscillated to move the lifting means from receiving position to dumping position and return. The connection of the pitman to the eccentric is preferably adjustable radially of the shaft 59 so that the extent of reciprocation of the rack gear 56, oscillation of the shaft 46, and pivotal movement of the lifting means 47 can be adjustably determined in accordance with dumping requirements. Further, adjustment of the limits of pivotal movement of the lifting means 47 is made possible by the utilization of a telescopically adjustable pitman 61 between the eccentric and the rack gear.

Figure 2:
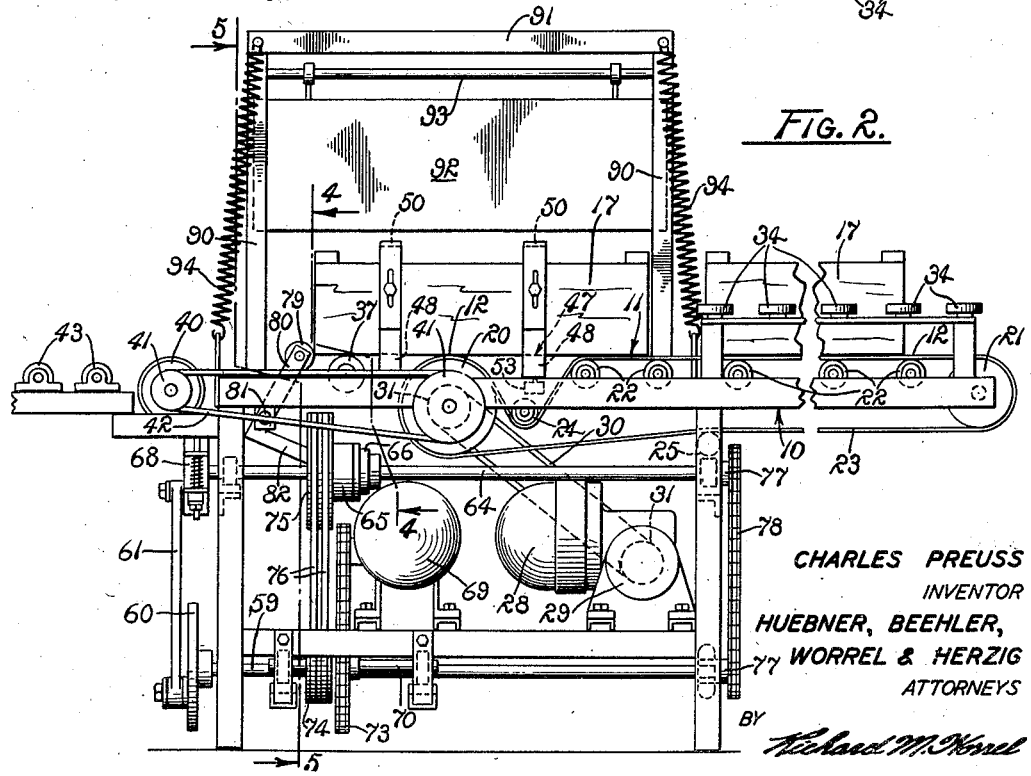
Fig. 2 is a side elevation of the structure shown in Fig. 1 showing a pair of boxes to be dumped in following relation in the device.

As best shown in Figs. 2 and 3, a drive shaft 64 is also mounted in the framework 10 in parallel relation to the shaft 59 and mounts a "single revolution" clutch 65 thereon. The clutch may be of any suitable form to provide controlling driving connection from the sheaves 70 to the drive shaft 64. A convenient and well known form provides a trip cam 66 against which a trip lever 67 pivotally mounted in the framework 10 operates. When the clutch is rotated by means soon to be described and the trip lever is released, the clutch rotates the shaft 64 a single revolution subsequent to which the trip lever 67 in engagement with the cam 66 interrupts rotation of the driving shaft 64 until the trip lever 67 is again released. An adjustable continuous drag friction brake 68 is also provided on the drive shaft 64 to preclude objectionable coasting thereof or motivation incident to weight supported on the lifting means 47.

The drive shaft 64 and associated structure is driven by a motor 69 mounted in the framework 10. In order to reduce the speed of the drive shaft 64 relative to the motor 69 and to provide driving interconnection therebetween, a transmission shaft 70 is journaled in the frame in parallel relation to the shaft 64. A driving sprocket wheel 71 mounted on the motor 69 has driven connection to a relatively larger sprocket wheel 72 mounted on the shaft 70 by means of a chain 73. The transmission shaft 70 has driving connection to the drive shaft 64 by means of a pulley 74 mounted on the shaft 70 and a relatively larger pulley 75 mounted on the shaft 64 circumscribed by a belt 76. The shaft 64 rotates the shaft 59 at the same speed by means of sprockets 77 of equal size mounted on said shafts and circumscribed by a chain 78.

As best shown in Figs. 1 to 3, a triggering roller 79 is rotatably mounted in the framework 10 at the side of the lifting means 47 toward which the boxes 17 are advanced by the conveyor 11 for pivotal movement between a rest position extended upwardly toward the dumping station 13, shown in Figs. 1 and 2, and a triggering position relatively upwardly therefrom, shown in Fig. 3. As has probably already been observed, the conveyor 11 defines a predetermined path of travel for boxes longitudinally thereof while the lifting means 47 provides a predetermined reciprocal elevational path of travel for boxes thereon. It will now be observed, that the triggering roller 79 is disposed in both the horizontal and elevational paths of travel of the boxes when in rest position and is disposed only in the horizontal path of travel when in triggering position. The triggering roller 79 is conveniently rotatably mounted on a pair of arms 80 pivoted on a pintle 81. A control lever 82 is extended from one of the arms 80 beneath the trip lever 67 which is pivotally mounted in the framework 10, as shown in Figs. 3 and 4. The lever 82 not only serves gravitationally to urge the triggering roller into rest position but translates movement of the roller 79 to triggering position into release of the trip lever 67 whereby the clutch 65 is actuated to rotate the shafts 64 and 59 a single revolution.

An auxiliary trough 83 is pivotally mounted on the upwardly extended edge of the wall portion 49 of the lifting means 47 and is extended therefrom to provide an extended end slidably rested on the trough 14. The auxiliary trough conveniently consists of a plurality of pipes 84 individually pivotally mounted on the wall portion 49, as by pipe T's 85, and covered with tubes 86 of rubber hose or other resilient material. The auxiliary trough 83 also provides side guards 87 also conveniently formed of pipes 84 covered with resilient tubes 86.

A pair of damper arms 90 are pivotally mounted on the shaft 46 on opposite sides of the trough 14 for pivotal movement between a position upwardly extended toward the conveyor 11, shown in Fig. 5 and a position upwardly extended over the packing conveyor 15. The arms are rigidly interconnected by a pair of ties 91 at opposite ends thereof. Pivotal movement of the arms 90 toward the conveyor is conveniently limited by engagement of the arms with the framework 10 or any desired auxiliary stop, not shown, and pivotal movement of the arms toward the trough 14 by engagement of one of the ties 91 with the framework. A damper flap 92 of flexible material such as fabric belting, sheet rubber, or the like is connected between the extended ends of the damper arms 90 by a rod 93 journaled transversely between the arms and is pendently supported in a position adapted to overlay successive boxes 17 raised to dumping position by the lifting means 47. Springs 94 and 95 connect the arms and the framework 10 and the arms and the trough respectively, to urge the arms into their position extended upwardly toward the conveyor 11.

*Operation*

The operational sequence and utility of the present invention are believed clearly apparent by reference to the figures in their numerical order and are briefly summarized at this point. Boxes 17 containing fruit 16 or other objects or material are positioned on the conveyor 11 by an attendant as needed. The transmission 29 is adjusted to deliver successive boxes to the dumping station 13 as culling, sorting, grading, and packing requirements of the packing conveyor 15 suggest.

As a box 17 is advanced into the dumping station 13, it slidably engages the wall portion 49 of the lifting means 47 and passes under the upper ends of the hook members 50. The hook members are so adjusted that the boxes, even if provided with upper cleats, have no difficulty in passing thereunder.

The idler roller 37 facilitates support of successive boxes as they are driven against the triggering roller 79 moving said roller from rest position to its triggering position, shown in Fig. 3. Movement of the roller 79 into triggering position lifts the trip lever 67 whereupon the clutch 65 rotates the eccentric 60 through the drive linkage previously described, moving the rack gear 56 upwardly as viewed in Figs. 5 and 6 and thence downwardly.

Upward movement of the rack gear 56 rotates the shaft 46 by means of the pinion 58 so as to pivot the lifting means 47 upwardly under the box 17 into the dumping position shown in Fig. 6. Intermediate the positions shown in Figs. 5 and 6, the box engages the damper flap 92 which overlays the box being dumped and cushions the release of fruit 16 therefrom. The springs 94 and/or 95 resiliently hold the damper flap 92 against the box and fruit during the dumping of the box and its return. Upward povital movement of the floor portion 48 results in the illustrated downward pivotal movement of the wall portion 49 integral therewith. Downward pivotal movement of the wall portion slides the auxiliary trough 83 longitudinally of the trough 14 and lowers the end thereof coupled to the wall portion to facilitate cushioning and careful discharge of fruit from the box.

It will be recalled that the switch 53 opens upon upward movement of the floor portion 48 of the lifting means 47 so that motivation of the conveyor 11 is interrupted during the dumping operation just described. The brake 68 assures prompt interruption with a minimum of coasting of the conveyor.

Upon downward movement of the rack gear 56, the lifting means 47 is returned to its receiving position, previously described, and the clutch 65 released until a subsequent box 17 again moves the triggering roller 79 to triggering position. During upward movement of the lifting means 47, the box engaged with the triggering roller 79 is elevated therefrom so that the triggering roller returns to its rest position. As the lifting means 47 returns to receiving position, it lowers the dumped box onto the triggering roller and conveyor 11 so that the box under the impetus given it by the conveyor, rolls over the triggering roller and onto the accelerating cylinder 40. The accelerating roller pulls such a box from the triggering roller and discharges it at an accelerated speed onto the rollers 43.

Return of the arms of the floor portion 48 to receiving position, closes the switch 53, reactivating the conveyor 11 to deliver a successive box 17 to the dumping station 13.

Proper adjustment of the transmission 29 assures an adequate but not excessive supply of fruit to the trough 14 as packing requirements suggest. Proper adjustment of the telescopic pitman 61 assures proper positioning of the lifting means 47 in its receiving and dumping positions. Radial adjustment of the connection of the pitman 61 to the eccentric 60 determines the extent of pivotal movement of the lifting means which may be varied to suit the dumping of various types of fruits, vegetables, and other articles and materials from the boxes 17.

The device of the present invention is fully automatic, dependable in operation, dumps fruit and other perishable commodities from the boxes with the utmost care and a minimum of damage thereto. In actual operation, it has minimized the waste of fruit and the like incident to dumping damage and has reduced the labor required. It has also proved advantageous in the assurance of a proper and automatically regulated supply of fruit or the like to the packing conveyor 15. The empty boxes are delivered on the rollers 43 to any convenient station for reuse, storage, or the like.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An automatic transfer device comprising an elongated conveyor, a chute substantially right angularly extended from the conveyor, a substantially L-shaped lift means having a floor and a wall in substantially right angular relation pivotally mounted on an axis transversely of the chute for reciprocal movement between a receiving position with the floor extended substantially horizontally transversely of the conveyor with the wall upwardly extended adjacent to the conveyor and a dumping position with the floor upwardly extended away from the conveyor and the wall downwardly extended toward the chute, an auxiliary chute pivotally mounted on the wall and having an extended end slidably supported on the chute, means for reciprocally positioning the lift means between receiving position and a dumping position, a pair of arms pivotally mounted concentrically of the pivotal axis of the lift means on opposite sides thereof for movement between positions upwardly extended over the conveyor and a retracted position upwardly extended over the chute, a flexible flap mounted between the upwardly extended ends of the arms in the path of movement of the lift means from receiving position to dumping position, and resilient means connected to the arms urging the arms pivotally toward the conveyor.

2. An automatic box dumping device comprising an elongated conveyor having a substantially horizontal upper surface and being adapted to advance boxes longitudinally thereof in a predetermined direction and substantially horizontal path of movement, a chute laterally extended from the conveyor at an elevation adjacent but below the conveyor, a shaft rotatably mounted adjacent to the conveyor transversely of the chute, a substantially L-shaped lift means having a floor and a wall in substantially right angular relation rigidly mounted on the shaft at a position in substantial alignment with the floor in spaced relation from the wall oppositely from the floor for reciprocal movement between a receiving position with the floor extended substantially horizontally transversely of the conveyor depressed below the upper surface thereof with the wall upwardly extended adjacent to the conveyor and a dumping position with the floor upwardly extended away from the conveyor and the wall downwardly extended over the chute defining a predetermined reciprocal elevational path of movement for boxes movable to and from the conveyor on the lift means, an auxiliary chute pivotally mounted on the upper end of the wall of the lift means and having an extended end slidably supported on the chute, a pair of arms pivotally mounted concentrically of the pivotal axis of the lift means on opposite sides thereof for movement between a position upwardly extended toward the conveyor and a retracted position upwardly extended over the chute, a flexible flap pendantly pivotally mounted between the upwardly extended ends of the arms in the path of movement of the lift means from receiving position to dumping position for engagement by boxes elevated by the lift means in movement from receiving position to dumping position, the flexible flap being of a length and being pivotally mounted between the arms at a position thereon such that the length of the flap is appreciably less than the upward spacing of the pivotal mounting of the flap from the auxiliary chute when the arms are in their position extended over the chute, and resilient means connected to the arms urging the arms pivotally toward the conveyor, a pinion mounted on the shaft, a rack gear engaged with the pinion, an eccentric having driving connection to the rack gear for endwardly reciprocating the rack gear to oscillate the shaft and pivot the lift means from receiving position to dumping position and return, and controlled drive means connected to the eccentric motivating the eccentric to reciprocate the rack gear.

3. In combination with an elongated conveyor having a substantially horizontal upper surface, a chute laterally extended from the conveyor, a substantially L-shaped lift means having a floor portion and a wall portion in substantially right angular relation pivotally mounted on an axis transversely of the chute adjacent to the conveyor and at a lower elevation than the conveyor for reciprocal movement between a receiving position with the floor portion extended substantially horizontally transversely of the conveyor with the wall portion upwardly extended from the conveyor and a dumping position with the floor upwardly extended away from the conveyor and the wall downwardly extended over the chute, an auxiliary chute pivotally mounted on the extended edge of the wall portion of the lift means and having an extended end slidably supported on the chute during sustantially all positions of the lift means, a pair of arms pivotally mounted concentrically of the pivotal axis of the lift means on opposite sides thereof for movement between positions upwardly extended toward the conveyor and a retracted position upwardly extended over the chute, a flexible flap pendantly pivotally mounted between the upwardly extended ends of the arms in the path of movement of the lift means from receiving position to dumping position for engagement by objects elevated by the lift means in movement from receiving position to dumping position, the flexible flap being of a length and being pivotally mounted between the arms at a position thereon such that the length of the flap is appreciably less than the upward spacing of the pivotal mounting of the flap from the auxiliary chute when the arms are in their position extended over the chute, resilient means connected to the arms urging the arms pivotally toward the conveyor, and means having driving connection to the lift means for moving the lift means from receiving position to dumping position and return.

4. A box unloading device comprising a conveyor adapted to carry loaded boxes to a predetermined dumping station and to carry emptied boxes from the dumping station, a chute laterally extended from the conveyor at the dumping station, substantially L-shaped lift means having a floor portion and a wall portion in substantially right angular relation mounted for pivotal movement about an axis substantially parallel to the conveyor transversely of the chute between a receiving position with the floor extended substantially horizontally transversely of the conveyor with the wall upwardly extended adjacent to the conveyor transversely of the chute and a dumping position with the floor upwardly extended away from the conveyor over the chute and the wall downwardly extended over the chute, means for oscillating the lift means between receiving and dumping positions, an auxiliary chute pivotally mounted on the extended edge of the wall portion of the lift means having an upper surface substantially flush with said extended edge of the wall portion and an extended end slidably supported on the chute, a pair of arms pivotally mounted concentrically of the pivotal axis of the lift means on opposite sides thereof for movement between a position upwardly extended toward the conveyor and a retracted position upwardly extended over the chute, a flexible flap pendantly pivotally mounted between the upwardly extended ends of the arms in the path of movement of the lift means from receiving position to dumping position for engagement by objects elevated by the lift means in movement from receiving position to dumping position, the flexible flap being of a length and being pivotally mounted between the arms at a position thereon such that the length of the flap is appreciably less than the upward spacing of the pivotal mounting of the flap from the auxiliary chute when the arms are in their position extended over the chute, and resilient means connected to the arms urging the arms pivotally toward the conveyor.

5. In combination with an elongated conveyor having a substantially horizontal upper surface and being adapted to advance boxes longitudinally thereof to a predetermined dumping station along a predetermined substantially horizontal path of movement, a chute laterally extended from the conveyor at the dumping station, substantially L-shaped lift means having a floor and a wall in substantially right angular relation mounted for pivotal movement about an axis transversely of the chute adjacent to the conveyor and at a lower elevation than the conveyor for reciprocal movement between a receiving position with the floor depressed below the upper surface of the conveyor with the wall upwardly extended from the conveyor and an upwardly pivoted dumping position with the floor upwardly extended over the chute and the wall downwardly extended over the chute, defining a predetermined elevational path of movement for boxes movable to and from the conveyor on the lift means, powered means having driving connection to the lift means pivotally moving the lift means from receiving position to dumping position and return, an auxiliary chute pivotally mounted on the upwardly extended end of the wall of the lift means and having an extended end slidably supported on the chute, a pair of arms pivotally mounted concentrically of the pivotal axis of the lift means on opposite sides thereof for movement between positions upwardly extended toward the conveyor and a retracted position upwardly extended over the chute, a flexible flap pendantly pivotally mounted between the upwardly extended ends of the arms in the path of movement of the lift means from receiving position to dumping position for engagement by boxes elevated by the lift means in movement from receiving position to dumping position, and resilient means connected to the arms urging the arms pivotally toward the conveyor.

6. An automatic transfer device adapted to receive perishable produce in open top boxes and to discharge the produce from the boxes comprising an elongated conveyor adapted to receive the boxes, a chute substantially right angularly extended from a side of the conveyor, a substantially L-shaped lift means having a floor and a wall in substantially right angular relation to the floor providing an extended edge, means pivotally mounting the lift means for movement about an axis transversely of the chute between a predetermined receiving position with the floor of the lift means substantially horizontally extended transversely of the conveyor with the wall substantially vertically extended transversely of the chute at the side of the conveyor from which the chute is extended and a predetermined dumping position with the floor of the lift means upwardly extended away from the conveyor with the wall downwardly extended over the chute, powered means having driving connection with the lift means for controlled oscillation thereof between its said pivotal positions, and an auxiliary chute pivotally mounted on the extended edge of the wall having an extended end slidably supported on the chute, said auxiliary chute being pivotal in relation to the wall of the lift means from downwardly disposed acute angular relation to the wall when the lift means is in receiving position, to alignment with the wall as the lift means is pivoted toward dumping position, and to an upwardly disposed obtuse angular relation with the wall with said auxiliary chute downwardly extended over the chute less precipitously than the wall when the lift means is in dumping position.

References Cited in the file of this patent

UNITED STATES PATENTS

| | | |
|---|---|---|
| 911,725 | Hyslop | Feb. 9, 1909 |
| 1,295,195 | Parker | Feb. 25, 1919 |
| 2,062,503 | Case | Dec. 1, 1936 |
| 2,068,156 | Taylor | Jan. 19, 1937 |
| 2,344,664 | Adams | Mar. 21, 1944 |
| 2,499,621 | Archer | Mar. 7, 1950 |